Figure 1:
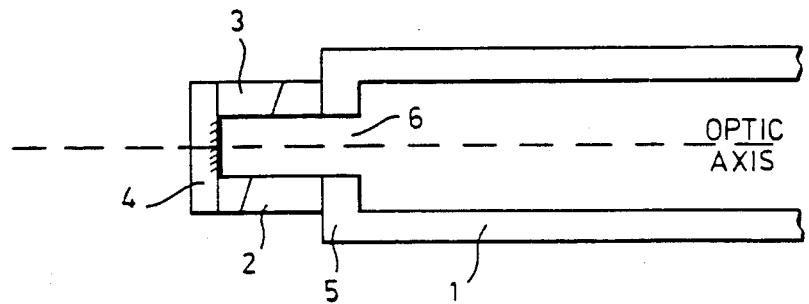

United States Patent [19]

Price et al.

[11] Patent Number: 4,759,031
[45] Date of Patent: Jul. 19, 1988

[54] LASERS

[75] Inventors: Henry T. Price, Caddington; Peter J. Syers, Framsden, both of England

[73] Assignee: Gec-Marconi Limited, England

[21] Appl. No.: 116,712

[22] PCT Filed: Feb. 27, 1987

[86] PCT No.: PCT/GB87/00139
§ 371 Date: Dec. 7, 1987
§ 102(e) Date: Dec. 7, 1987

[87] PCT Pub. No.: WO87/05451
PCT Pub. Date: Sep. 11, 1987

[30] Foreign Application Priority Data

Feb. 28, 1986 [GB] United Kingdom ............. 8605031

[51] Int. Cl.$^4$ ................................. H01S 3/08
[52] U.S. Cl. ........................... 372/107; 372/61; 372/65
[58] Field of Search ............... 372/107, 108, 65, 61, 372/98

[56] References Cited

U.S. PATENT DOCUMENTS

| | | |
|---|---|---|
| 3,855,547 | 12/1974 | Kirk . |
| 4,638,486 | 1/1987 | Dost et al. ............... 372/108 |
| 4,653,060 | 3/1987 | Barth et al. ............... 372/61 |
| 4,653,063 | 3/1987 | Acharekar et al. ........... 372/108 |
| 4,672,626 | 6/1987 | Koseki .................... 378/108 |

Primary Examiner—Léon Scott, Jr.
Attorney, Agent, or Firm—Kirschstein, Kirschstein, Ottinger & Israel

[57] ABSTRACT

A mounting for a laser cavity reflector consists of two abutting rings, in the form of discs, mounted on the cavity housing and concentric with the optic axis, the reflector being attached to the free end of the outer disc. The discs are independently rotatable and non-parallel-sided so that the relative rotation of the disc adjusts the orientation of the reflector and effects tuning of the optical system.

8 Claims, 1 Drawing Sheet

LASERS

This invention relates to lasers and particularly to mounting means for laser reflectors.

In the design of gas lasers there is a need to provide for accurate alignment of the cavity reflectors and location of the reflectors in a fixed, permanent manner such that the alignment is not disturbed. The reflectors must generally be aligned parallel within the order of 10 micro-radians and must then be fixed to the laser in a way which is vacuum tight and mechanically robust. The alignment tolerance and vacuum integrity must be maintained through subsequent exposure to vibration, shock and temperature cycling; the reflection must also not be susceptible to misalignment over prolonged times, in or out of use.

The usual manner in which this is achieved is to seal each of the reflectors into a tunable mirror mount. The mount generally incorporates a deformable, usually metal, member which is foricbly adjusted for tuning. Such arrangements are susceptible to long term creep and are generally difficult to incorporate in the laser design, in such a way that an expansion match is achieved throughout the cavity.

In an alternative arrangement, an outer, vacuum-tight housing is provided for the laser so that the reflector mount is adjustable but not vacuum tight.

An object of the invention is to provide a laser with reflector mounting means which is at the same time easy to adjust very accurately, mechanically strong and inherently vacuum tight.

According to one aspect of the invention, a laser comprises mounting means for controlling the attitude of a laser cavity reflector with resepct to the laser cavity housing, the mounting means comprising a pair of ring members each having first and second non-parallel optically flat surfaces, the ring members being connected to each other by optical contact between the first surfaces and respectively connected to the reflector and an end face of the housing by optical contact with the second surfaces, the ring members being orientated with respect to each other and to the reflector to determine the attitude of the reflector with respect to the end face, and the optical contacts providing a mechanically strong mounting for the reflector and a vacuum tight optical seal to the cavity housing.

The reflector may be composed of a different material from the ring members, there then being a third ring member interposed between the mounting means and the reflector, the third ring member being composed of the same material as the pair of ring members and being optically sealed to the adjacent ring member and metallurgically sealed to the reflector.

The ring members, the cavity housing and the reflector may be composed of a low expansion glass ceramic.

There may be two mounting means one in respect of each laser reflector. Alternatively, there may be only one mounting means, the other reflector of the laser being fixed to the cavity housing by metallurgical sealing.

According to another aspect of the invention a method of manufacturing a laser includes the steps of mounting at least one reflector of the laser on the laser cavity housing by interposing between optically flat surfaces associated respectively with the reflector and an end face of the housing, mounting means comprising a pair of ring members each having first and second non-parallel optically flat surfaces, the first surfaces being in contact, rotating the ring members independently and in unison until the laser reflectors are parallel, and producing an optical seal between abutting ones of the optically flat surfaces.

A volatile lubricating liquid may be interposed between abutting ones of the surfaces to permit, temporarily, independent rotation of the rings.

Figure 2:
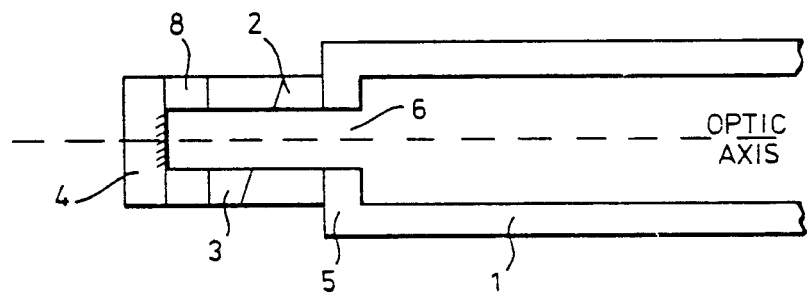

Two embodiments of the invention will not be described, by way of example, with reference to FIGS. 1 and 2 of the accompanying drawings, showing, diagramatically, axial sections of a laser body.

Referring to FIG. 1, a laser comprises a body or housing 1, and a reflctor 6 positioned at each end of the optical cavity. Only one end is shown here, the other being similar except that the reflector is partially transmissive and serves as the output member of the laser. The housing 1 has an end wall 5 perpendicular to the optic axis with a central circular opening 6. A pair of rings 2,3 are mounted between the wall 5 and the reflector 4, around the opening 6. Each ring has non-parallel opposite faces, i.e. slightly inclined to each other to provide a kind of wedge form, the two wedges being of equal angle. It will be apparent that when the two rings are in abutment, as shown, relative rotation about the optical axis causes a difference in the relative attitudes of their outer faces from zero to twice the wedge angle, according to their relative orientation. This off-axis attitude can then be steered around 360° by rotation of the two rings together. Thus, effectively, steering of one outer ring surface relative to the other outer ring surface is provided about orthogonal x and y axes.

For the laser to operate effectively it is essential that the two reflectors are parallel and substantially perpendicular to the optic axis. In the case of a $CO_2$ TEA laser for example, the reflectors must be parallel within a tolerance of 10 micro-radians. The rings 2,3 are independently rotatable and enable fine adjustment of the attitude of the reflector 4 about x and y axes, where these axes are perpendicular and in a plane perpendicular to the optic axis. The angle over which the reflector can be 'tuned' is determined by the wedge angle of the rings. Generally this angle will be very small, sufficient only to give a tuning angle of perhaps 5 minutes. The diagram is of course greatly exaggerated in this respect.

The rings 2,3, the body 1 and ideally also the reflector 4 are made of the same material. The abutting surfaces between the ring 2 and the housing 1, between the rings 2 and 3, and between ring 3 and reflector 4 are optically polished, typically to a flatness of /10 or better. This has the effect of producing a very intimate vacuum tight seal between the abutting surfaces. Once pressed into contact, the seal between the members acquires considerable mechanical strength, i.e. sufficient to provide the sole support for the assembly, and is effectively irreversible. In order to permit tuning of the optical system a drop of water or other volatile fluid is inserted between the surfaces, so permitting free rotation of the rings 2 and 3 until the water has evaporated. This gives sufficient time to make the rotational adjustments, following which, the abutting surfaces make optical contact and seal automatically. A mechanically strong vacuum-tight connection of the components is thus achieved. A protective outer housing (not shown) is provided for the laser assembly but has no requirement to be vacuum tight. Since the components are made of the same material, thermal expansions are matched throughout the assembly and the system does not 'detune' with temperature variation. The same material is used for the components at the other end of the cavity. A low expansion glass ceramic provides the necessary mechanical, vacuum and optical characteristics.

If the reflector 4 is of a different material to the rings, as, for example, with a Ge or ZnSe output member on a $CO_2$ laser, the problem of thermal expansion differences is alleviated by the arrangement shown in FIG. 2. An additional plane parallel-sided ring 8 is used between ring 3 and reflector 4. This additional ring is made of the same material a spring 3 to which it is optically sealed as above, and the reflector 4 is rigidly attached to the additional ring by a metallurgical seal, indium for example.

For either embodiment the wedged components could be discs instead of rings, if the material used transmits at the laser wavelength, but rings are preferred so as to minimise optical losses.

The facility for fine adjustment before the components are permanently sealed permits extremely accurate alignment of the reflectors while relaxing the need for very tight manufacturing tolerances in the components. The essential feature is this facility for extremely accurate adjustment in a component which forms part of a gas tight envelope. This technique can be applied to any laser incorporating reflectors and a gas envelope.

Clearly, only one such mounting means is necessary, the reflector at the other end being rigidly fixed, by optical contacting or metal brazing, before adjustment of the first reflector to produce parallelism. The provision of two such mounting means allows both parallelism of the reflectors and correct alignment of the optic axis to be achieved. A double ended adjustment does additionally provide extra flexibility.

We claim:

1. A laser comprising a laser cavity housing having two end faces; a pair of laser cavity reflectors; and mounting means for controlling the attitude of one of said laser cavity reflectors with respect to said laser cavity housing, said mounting means comprising a pair of ring members each having first and second non-parallel optically flat surfaces, said ring members being connected to each other by optical contact between said first surfaces and respectively connected to said one reflector and one of said end faces of said housing by optical contact with said second surfaces, said ring members being orientated with respect to each other and to said one reflector to determine the attitude of said one reflector with respect to said end face, and said optical contacts providing a mechanically strong mounting for said reflector and a vacuum tight optical seal to said cavity housing.

2. A laser according to claim 1, wherein said ring members are composed of the same material so that the attitude of said reflector is not affected by thermal expansion effects.

3. A laser according to claim 2, wherein said reflector is composed of a different material from said ring members, and comprising a third ring member interposed between said mounting means and the reflector, said third ring member being composed of the same material as said pair of ring members and being optically sealed to the adjacent ring member and metallurgically sealed to said reflector.

4. A laser according to claim 2, wherein said ring members, said cavity housing and said reflector are composed of a low expansion glass ceramic.

5. A laser according to claim 1, comprising two said mounting means one in respect of each said laser cavity reflector.

6. A laser according to claim 1, comprising a laser cavity reflector at each end of said laser cavity housing, one said reflector being fixed to said cavity housing by metallurgical sealing, and the other said reflector being attached to said mounting means.

7. A method of manufacturing a laser comprising a laser cavity housing having two end faces, and a pair of reflectors, including the steps of mounting at least one reflector of the laser on the laser cavity housing by interposing between optically flat surfaces associated respectively with the reflector one said end face of the housing, mounting means comprising a pair of ring members each having first and second non-parallel optically flat surfaces, the first surfaces being in contact, rotating the ring members independently and in unison until the laser reflectors are parallel, and producing an optical seal between abutting ones of said optically flat surfaces.

8. A method according to claim 7, wherein a volatile lubricating liquid is interposed between abutting ones of said surfaces to permit, temporarily, independent rotation of the rings.

* * * * *